US012327440B2

(12) United States Patent
Ru et al.

(10) Patent No.: US 12,327,440 B2
(45) Date of Patent: Jun. 10, 2025

(54) METHOD AND SYSTEM FOR ON-SITE TESTING OF AN OFF-ROAD VEHICLE INTERVENTION SYSTEM

(71) Applicant: HEXAGON GEOSYSTEMS SERVICES AG, Heerbrugg (CH)

(72) Inventors: Xiao Ru, Lucerne (CH); Peter Spring, Thalwil (CH); Linus Arnö, Lucerne (CH); Johannes Huber, Walchwil (CH); Fabien Kritter, Rüschlikon (CH)

(73) Assignee: HEXAGON GEOSYSTEMS SERVICES AG, Heerbrugg (CH)

( * ) Notice: Subject to any disclaimer, the term of this patent is extended or adjusted under 35 U.S.C. 154(b) by 239 days.

(21) Appl. No.: 17/669,246

(22) Filed: Feb. 10, 2022

(65) Prior Publication Data

US 2023/0252828 A1 Aug. 10, 2023

(51) Int. Cl.
*G07C 5/02* (2006.01)
*B60T 7/22* (2006.01)
*B60W 10/04* (2006.01)
*B60W 10/18* (2012.01)
*B60W 30/09* (2012.01)
*B60W 50/14* (2020.01)
*G07C 5/08* (2006.01)

(52) U.S. Cl.
CPC ............ *G07C 5/02* (2013.01); *B60T 7/22* (2013.01); *B60W 10/04* (2013.01); *B60W 10/18* (2013.01); *B60W 30/09* (2013.01); *B60W 50/14* (2013.01); *G07C 5/085* (2013.01); *B60W 2050/146* (2013.01); *B60W 2300/125* (2013.01); *B60W 2300/152* (2013.01); *B60W 2300/17* (2013.01)

(58) Field of Classification Search
CPC ....................................................... G07C 5/02
See application file for complete search history.

(56) References Cited

U.S. PATENT DOCUMENTS

| 5,610,815 | A | 3/1997 | Gudat et al. | |
|---|---|---|---|---|
| 10,816,986 | B2 | 10/2020 | Manjunath et al. | |
| 11,149,407 | B2 * | 10/2021 | Graves | G08G 1/166 |
| 2018/0060467 | A1 | 3/2018 | Schulte et al. | |
| 2023/0252828 | A1 * | 8/2023 | Ru | G07C 5/085 |
| | | | | 701/120 |

FOREIGN PATENT DOCUMENTS

| CN | 112326265 A | * | 2/2021 |
|---|---|---|---|
| CN | 115031981 A | * | 9/2022 |

(Continued)

OTHER PUBLICATIONS

Ruff, Advances in Proximity Detection Technologies for Surface Mining, May 2004 (Year: 2004).*

(Continued)

*Primary Examiner* — Michael A Berns
(74) *Attorney, Agent, or Firm* — Maschoff Brennan

(57) ABSTRACT

An on-site test facility and method for validation of an off-road vehicle intervention system onboard an utility vehicle, for example at a mine, using a testing area in the field with a test lane and a computer unit configured to emulate a virtual test object by generating and transmitting a RF-signal corresponding to RF-signal of a real object being in risk of collision with the oversized vehicle when a driver is driving the utility vehicle on the test lane.

20 Claims, 2 Drawing Sheets

(56) References Cited

FOREIGN PATENT DOCUMENTS

| KR | 10-2019-0021840 A | | 3/2019 |
|---|---|---|---|
| WO | WO2022184127 A1 | * | 9/2022 |

OTHER PUBLICATIONS

"ISO/TS 21815-2:2021 Earth-moving machinery—Collision warning and avoidance—Part 2: On-board J1939 communication interface" https://www.iso.org/standard/77303.html, Jul. 2021.

Norman Abramason, The Aloha System—Another Alternative for Computer Communications, University of Hawiii (1970).

Glynn, P.J., "Collision Avoidance Systems for Mine Haul Trucks and Unambiguous Dynamic Real Time Single Object Detection," VDM Publishing, pp. 1-240 (2005).

"ISO 21815-1:2022(E) Earth-moving machinery—Collision warning and avoidance—Part 1: General requirements" (2022).

AU Patent Examination Report dated Feb. 6, 2024 as received in Application No. 2023200472.

CL Office Action dated Feb. 8, 2024 as received in Application No. 2023000292.

LabSat 3 Wideband, LabSat, Retrieved on Feb. 26, 2025, Retrieved from: https://www.labsat.co.uk/index.php/en/products/labsat-3-wideband?gad_source=1&gbraid=0AAAAACg6KV5XzxFIMM94wf3Cka7rFTH.

GNSS Simulation, Rohde & Schwarz, Retrieved on Feb. 26, 2025, Retrieved from: https://www.rohde-schwarz.com/au/products/test-and-measurement/digital-standards/gnss-simulation_63493-1124871.html?change_c=true.

GNSS Simulators, Safran, Retrieved on Feb. 26, 2025, Retrieved from: https://safran-navigation-timing.com/solution/gps-simulators/.

GNSS Simulation, Yotavis, Retrieved on Feb. 26, 2025, Retrieved from: https://www.yotavis.ch/gnss-simulation/?lang=en.

S. Capkun and J.-P. Hubaux, "Secure positioning of wireless devices with application to sensor networks," Proceedings IEEE 24th Annual Joint Conference of the IEEE Computer and Communications Societies., Miami, FL, USA, 2005, pp. 1917-1928, vol. 3, doi: 10.1109/INFCOM.2005.

Ultra-Wideband, Qorvo, Retrieved on Feb. 26, 2025, Retrieved from: https://www.qorvo.com/products/wireless-connectivity/ultra-wideband.

* cited by examiner

METHOD AND SYSTEM FOR ON-SITE TESTING OF AN OFF-ROAD VEHICLE INTERVENTION SYSTEM

BACKGROUND

The present disclosure relates to a method and system for pre-shift or in or near operation testing of an off-road vehicle intervention system.

By way of example, working sites such as surface or open-pit mines, construction sites, farming sites, ports, container terminals, saw mills and similar off-road sites or areas are generally operated by means of a large number of machinery, vehicles, and staff. Some of the utility vehicles may be exceedingly large and heavy, wherein control of such oversized vehicles is difficult and dangerous, e.g. because of limited operator visibility, either "blind spots" caused by the operator's position or caused by the environment (such as berms, highwalls, stacked containers, etc.). Thus, a person or a regular vehicle, e.g., a passenger car or street legal vehicle, working in the vicinity is at risk from a movement of such utility vehicles, in particular if they are oversized. Heavy traffic, large equipment, and poor visibility all create the potential for accidents.

It has been proposed to use GNSS-devices (GNSS=global navigation satellite system, such as GPS) on board of vehicles and other objects, such as cranes, to generate proximity warnings or warnings of potential collision (path or trajectory prediction) in order to reduce the risk of collisions between vehicles and/or persons. Such a system may be based on devices mounted to the objects, each device comprising a GNSS receiver, a control unit for deriving positional data, including a velocity vector, using the signal of the GNSS receiver, a radio circuit for wireless exchange of the positional data with the other devices, and an output device for outputting proximity warnings, e.g. allowing the driver of a vehicle to obtain information on some of the obstacles or persons nearby.

However, a GNSS system may lose accuracy, e.g. when multi-path situations occur. For example, a multi-path situation occurs when signals transmitted from GNSS satellites are reflected by local terrain, buildings, or machinery, thereby resulting in a plurality of signals being received by the GNSS receiver. Due to the plurality of signals being received, each of which may be phase shifted and/or time delayed, the GNSS receiver may not be able to accurately detect its location. Thus, if the GNSS system loses accuracy, such as due to entering a multi-path environment, the overall warning system may be severely hindered in its accuracy.

The deficiencies of a GNSS based warning system may be overcome by using a radio based positioning system. An assembly of radio frequency (RF) devices, often called "anchors" and "tags", may be distributed over several locations, which devices communicate with each other. Some of the devices may be installed on vehicles or other movable objects while others may be installed at fixed locations. For instance in an underground mine, anchors (standard or AOA) are placed at regular intervals and at neuralgic positions throughout the underground mine. The placement can make sure that each vehicle can always see more than one anchor at a time.

For example, a radio frequency device, i.e. an anchor or tag, may comprise a radio transceiver for RF time-of-flight measurements (e.g. by two-way ranging or by time-difference-of-arrival), based on a defined measurement protocol for radio communication, e.g. the ALOHA protocol. In particular, ultra-wideband signals may be used to mitigate for multi-path effects.

Such a warning system may be embodied as a collision avoidance or awareness system (CAS). Each CAS antenna, regularly one per vehicle, is equipped with an Ultra-Wideband transceiver. The vehicles regularly perform two-way ranging with the surrounding vehicles and measure the distance. The antenna position on the vehicle is part of the ranging payload. For collision prediction, a GPS position of other vehicles which is transmitted through a radio channel, and the measured distance through TOF ranging can be fused to improve the relative position accuracy, e.g. an extended Kalman filter, which tracks the relative position/velocity and potential GPS position offsets through measurement errors. Another known additional measure is dead reckoning, i.e. to compare the change of position (and velocity) by means of the measured forces (accelerations) and rotational rates.

CAS improves safety (and can also reduce metal contact) by improving the situation awareness around vehicles by allowing operators to see vehicles that otherwise could not be seen. Further, traffic awareness and collision warnings can be displayed to the driver. CAS can provide drivers of large vehicles with 3600 proximity detection at any speed and in all conditions via cabin display units.

However, incidents can still happen due to various factors such as human error and fatigue.

Thus, it is known to add an additional layer of safety on top of the CAS by a vehicle intervention system (VIS). VIS can intervene in traffic on the site and, by reacting when and if operators do not, it ensures safety rules are followed. A vehicle intervention system can detect and prevent collisions e.g. by automatically slowing down or even stopping a haul truck if an imminent collision is detected, i.e. an automatic active breaking in case of a potential collision can be executed.

The VIS can at least partly take control of the machine, e.g. control the propulsion system, in certain defined situations if the operator does not react appropriately to the initial warning provided by the CAS. The system can then act depending on the situation, either by inhibiting propulsion, activating or dynamically controlling the so called "Retarder" (usually providing a wear-less braking) or applying the service brake. An industry standard for such a VIS is according to ISO 21815 the Level-9 intervention control level or level of incident control, with intervention controls with respect to reduce speed or braking (Level 1 to Level 6: Processes, Rules, Training, etc., Level 7: "Vehicle Awareness" (of surrounding vehicles on screen, etc.), Level 8: "Collision Awareness" (beeping, etc.), Level 9: "Collision Avoidance" (by means of active intervention).

In other words, such a Vehicle Intervention System can partly take control of the truck, in particular by cutting propulsion, brake or—where appropriate—cut the propulsion to the so-called "implements" (such as the dump body with a haul truck or the boom/stick etc. with an excavator).in defined situations if the operator does not react appropriately to a warning from the Collision Avoidance System (the operator is always warned by the system prior to intervention by both audio and visual notification). For example, a VIS automatically applies the following functions to the truck, depending on situation and implementation: Forward Propel Inhibit, Reverse Propel Inhibit, Dump Body Up Inhibit, (Dynamic) Retarder Application and Service Brakes ("metal-to-metal") Application.

To actually provide an additional layer of safety, it is of course mandatory that the VIS functions properly. However, at present there is no possibility for an operator in the field to safely validate if the VIS of his vehicle works well, in particular if all critical safety features of the VIS indeed operate as intended. Thus, any failure of the VIS may go unnoticed and hazardous situations may not be prevented by it.

SUMMARY

It is therefore an object of the present disclosure to provide a method for on-site validation of a VIS of a utility vehicle, in particular a mining or construction vehicle.

It is a further object of the present disclosure to provide a method which allows a daily on-site validation of a VIS.

Another object is to provide a system for a VIS-on-site validation which is substantially maintenance-free.

Those objects are achieved by realizing the features described herein. Features which further develop in an alternative or advantageous manner are described.

The disclosure relates to an on-site test facility for validation of an off-road vehicle intervention system (VIS), the vehicle intervention system or VIS being installed onboard an utility, in particular oversized vehicle and/or off-road/off-highway vehicle, such as a mining vehicle, construction vehicle, agricultural vehicle or truck, for example a haul truck, a crane, a dragline, an excavator, a shovel, a grader, a dozer, water truck, dump truck, mining truck, loader, camion or a tractor. The vehicle intervention system is configured to temporarily take over control from the utility vehicle's driver of at least one motion function, in particular the propulsion or brake, of the utility vehicle based on or in response to RF-signals sent by and received from an object on the site which the utility vehicle might collide with, for example another nearby vehicle (proximity intervention) and/or a vehicle in the path of the utility vehicle or heading thereto (path or trajectory intervention). Said RF-signals transmit at least positional data of the respective object. In particular, the intervention control features takeoff inhibit, slow and stop, using the industry defined ISO 21815 intervention control interface standard or OEM specific/proprietary protocols between PDS (proximity detection system) and OEM machines.

The facility comprising a testing area at the working or construction site, in particular a mine, ("at" to be understood in a broad sense, meaning a location within the site as such as well as attached/close thereto, such that in any case the facility is accessible as part of a regular pre-shift task). The facility comprises a test lane and a computer unit configured to emulate one of said "collision-risk" or "opponent" objects by generating and transmitting a RF-signal, corresponding to RF-signal of a real object being in risk of collision with the utility vehicle when a driver is driving the utility vehicle on the test lane.

That is, there is an electronic on-site test station which "simulates" a vehicle or the like in range or path of the utility vehicle under off-road and particularly oversized conditions by signalling to the utility vehicle's VIS as if there really was such an object on the test lane or heading towards it, such that when approaching or coming very close to this "virtual" object (immediate risk of collision), the utility vehicle's VIS should be triggered by the test station's "dummy" signals and should react accordingly—if not broken.

For example, the emulated object is a movable object and the computer unit generates and transmits RF-signals containing object's positional data, designated heading or path data and dimensional data (a size of the object). As another option, the computer unit creates a virtual dummy object by generating and transmitting RF-signals corresponding to all types of RF-signals of the emulated real object. That is, the full set of RF-signals, all information which an according real vehicle etc. produces and transmits on-site is produced by the test station, covering or providing all data transmitted by the corresponding real object.

In a further developed embodiment, the computer unit is configured to adapt the emulation to the utility vehicle resp. vehicle intervention system, either according to the individual vehicle or to a vehicle class. That is, there is provided not a fixed or "one-size-fits-all" verification emulation or routine but different ones which differ at least partly as an adaption to different demands of different vehicle (types).

Optionally, the computer unit is configured to validate VIS control of brake system/auto brake (so called "Brake Assistant", i.e., to control the vehicle by means of the Service Brake), propulsion/motor (so called "Launch Assistant", i.e., to cut the propulsion from the engine to the wheels . . . ") and manual VIS disablement (override button). As other option, the validation comprises test of level-7 and level-8 functions according to ISO 21815 of a collision avoidance system the vehicle intervention system is embedded in, RF-receiver, GNSS receiver, user interface, CAN communication (in particular between vehicle intervention system and vehicle's control system/OEM), inertial measurement unit, ultra-wide band time-of-flight measurement unit, or a status of brake system and propulsion of the utility vehicle.

In still another embodiment, the test facility comprises a mark for marking an entry and/or exit of the test facility and/or test lane, preferably a geofence. Additionally or alternatively, there is a marking of a real position corresponding to an object's emulated position on the test lane visible to the utility vehicle's driver, in particular wherein the position mark is variable as an adaption to the emulated object type and/or position, e.g. if a moving object is emulated, the mark may move accordingly, or different sizes of different objects may be differently marked.

Optionally, the computer unit is configured to inhibit an exit of the utility vehicle from the test area if there is no positive validation result, in particular wherefore the test facility comprises a mechanical barrier, in particular a boom gate, at an exit of the test area controlled by the computer unit. As another option, the test facility comprises a signal light for signalling a status of the validation procedure to the driver, in particular a final result of the validation.

Aspects also relate to a method for on-site validation of an off-road vehicle intervention system for collision avoidance at a testing area at working site such as a mine with a test lane, the vehicle intervention system being installed onboard an utility vehicle such as an oversized vehicle of a mine and being configured to temporally take over from the utility vehicle's driver control of at least a motion function, in particular the propulsion, of the utility vehicle in order to avoid collision with objects on the site based on/in response to RF-signals sent by and received from a respective object, the RF-signals at least transmitting positional data of the respective object.

The method comprises (virtually) emulating one of said objects by generating and transmitting a RF-signal corresponding to a RF-signal of a real object being in risk of collision with the utility vehicle when a driver is driving the utility vehicle on the test lane.

Optionally, the method comprises a verification if a (nominal) reaction of the vehicle intervention system is triggered by a received RF-signal, preferably an (emergency) braking or propulsion cut. For example, it is verified if the reaction is within or according to normal test routine values.

Thereby, verifying optionally comprises the steps of uploading a log file from the vehicle intervention system to a server (which may be part of the computer unit), looking for a collision alarm, caused by the emulated object, in the log file, and looking for an intervention command from the vehicle intervention system to the vehicle and for a confirmation of the intervention command by an OEM unit of the vehicle. That means that it is checked in the log file(s) if an intervention command was given out by the VIS in triggered by the opponent object and if it was confirmed by the vehicle's main unit. As an additional optional measure, data from a test facility's sensor, preferably a camera, is used for verifying presence and/or extent of a reaction of the vehicle responsive to the intervention command. For instance, image data is automatically evaluated by computer vision to check if the vehicle actually slowed down or braked.

In a further development, a position and/or time information such as a so called time-to-impact, relating to an expected reaction to be triggered is displayed to the driver, preferably on a driver's display of the vehicle intervention system. That is, the driver is informed where or when an intervention of the VIS should happen.

Preferably, the method is an integral part of a regular, in particular daily, pre-flight or pre-shift check. Optionally, the method comprises an identification of the utility vehicle or vehicle intervention system and adapting the validation according to the identification. Thereby, a validation or test history can be taken into account for the adaption, for example adaption in form of different test intervals (e.g. more frequent tests in case of previous failures) or further actions such as order for workshop check intervals.

Aspects also relate to a computer program product having computer-executable instructions implemented for executing the inventive method as described above, in particular when the computer program product is run on a computer unit of a test facility as described above.

The method and system for on-site validation of a vehicle intervention system, the system comprising said vehicle intervention system and said on-site test facility for validation of the vehicle intervention system, by emulating a collision-risk object by generating and transmitting a RF-signal corresponding to RF-signal of a real object being in risk of collision with the utility vehicle when a driver is driving the utility vehicle on the test lane of the test facility are described or explained in more detail below, purely by way of example, with reference to working examples shown schematically in the drawing.

DETAILED DESCRIPTION

Figure 1A:
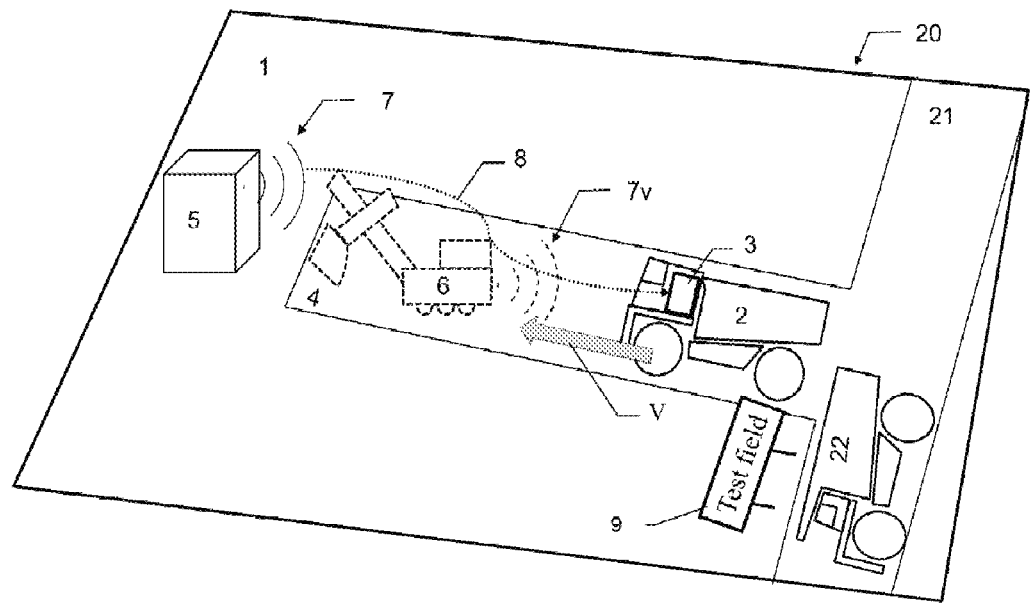
FIGS. 1a,b: schematically depicts a first example of an in-field test facility and method for testing an off-road vehicle intervention system.

FIG. 1a,b schematically depict in a semi-3D-view a first example of a test facility and method for testing a vehicle intervention system. The test facility 1 is situated in the field, in the example at a mine 20 next to a "normal" haul road 21 where production traffic, in the example a truck 22, is going. The test facility 1 comprises a test lane 4 which bifurcates of the haul road 21, whereby in the example the entry of the test facility or the beginning of the test lane 4 is marked by a sign 9. Such, the test facility 1 is on-site mine 20 which allows for example that production vehicles such as oversized truck 2 can directly enter the test area 1 from the normal traffic. The easily accessible test facility 1 integrated in mine 20 allows a frequent testing, e.g. even a pre-flight check every working day.

Typically, such sites 20 cover a large area, in the case of a surface mine as depicted in FIG. 1a, e.g. in the range of square kilometres, with a network of roads 21 and other traffic ways, such as rails. A plurality of utility vehicles, for example oversized movable objects 2, 22 may be present in the mine, e.g. haul trucks or heavy duty excavators, wherein pedestrians or regular sized vehicles, e.g. street legal cars or trucks, are at severe risk from a movement of the oversized object 2, 22.

Such oversized machinery or oversized vehicles 2, 22 may easily weigh several 100 tons, and they are generally difficult to control and have a large number of blind spots that the driver or operator is unable to constantly monitor. Any collision with a smaller object, in particular a pedestrian or a regular car, may be potentially fatal for the weaker object.

For example, when a compactor is working in close proximity of a dozer following it and the dozer suddenly stops and starts to reverse can lead to a collision if neither of the operators is paying enough attention to their surroundings. As another example, a surveyor may be working in close proximity of an excavator without being noticed by the operator of the excavator. However, danger may also arise even if an operator of heavy machinery 2, 22 is paying attention. For example, an operator of a large cantilever crane may not immediately see small cantilever movements, e.g. caused by wind or inertia moments, which may be potentially dangerous for a spotter in the vicinity of the cantilever.

Furthermore, the mine 20 is comprised of stationary obstacles, such as temporary or permanent buildings, open pits, boulders, non-movable excavators, stationary cranes, deposits, etc. Given the large operating force exerted by such oversized machinery 2, 22, a collision with a stationary obstacle may cause severe damage to both the utility vehicle 2, 22 and the stationary obstacle, and may even compromise safety of an operator of the oversized object.

Therefore, the risk of accidents in such an environment is high, specifically under adverse conditions as bad weather, during night shifts, etc.

As a countermeasure, utility vehicles 2, 22 comprise a vehicle intervention system 3 (for better clearance only indicated at vehicle 2). Such a vehicle intervention system (VIS) 3 is for example part of a collision awareness system (CAS) or proximity warning system (so called "Proximity Detection and Prediction System", PDS), that is it can be used in combination with a range of generic alarming and collision awareness systems (CAS systems), e.g. it may be integrated into GNSS-based and/or radar based CAS systems, and provides an additional security level (in particular according to the ISO 21815 Level 9 control) in that in can automatically control basic functions of the vehicle 2 in case the vehicle's driver does not react properly to a dangerous situation. Namely, if another object (e.g. vehicle or human being) is within direct radius of action of truck 2, e.g. on or heading towards the track of vehicle 2, and there is a risk of collision and the vehicle's driver does not react thereto, e.g. does not decelerate or stop his truck 2, then the VIS 3 takes over control of the truck 2, e.g. in that it activates the brakes or cuts off propulsion and therewith helps to avoid a collision.

To enable a VIS 3 to do so, in other words to provide situation awareness, the objects, in particular vehicles 2, 22 and pedestrian, at the mine 20 are equipped with radio frequency (RF) transceivers, e.g. using ultra-wideband signals, which at least communicate respective live positional information to other objects nearby. For instance, the utility vehicles' VIS 3 actively communicate to each other actual positional information, heading and velocity whereas traffic participants which are "soft" resp. do not have VIS 3 (only tags) may just emit such information but do not receive it. Hence, a VIS 3 "knows" about at least distance or position of other objects nearby or within a certain range.

In particular, further information or data may be sent, e.g. all participants may have and transmit a unique IDs, e.g. configured during manufacture. By way of example, a VIS 3 or tag may periodically send a BLINK message, e.g. comprising payload including ID, protocol version, timing information for a time-of-flight ranging determination, battery status, panic button status, other sensor information, coordinates etc., responses after a random time interval (e.g. within a limited time window), wherein payload may include ID and protocol version. A measurement protocol may further comprise reporting to a base, e.g. wherein after transmission/reception of a FINAL message, the VIS 3 or CAS sends a CAN message and another participant/object enters measurement in queue.

As in case of every appliance, there is a risk that a VIS 3 may not function properly which however would go unnoticed until it is "too late", that is until a collision already has happened. The test facility 1 solves this problem by providing a computer unit 5 which generates and transmits RF-signals 7 to the utility vehicle 2 which VIS 3 is to be checked. These RF-signals 7 correspond to the RF-signals of the transceivers of other traffic participants of the mine 20 as described above. That is, the VIS 3 of the truck 2 can receive and process the signals 7 of the test station 5 like RF-signals of other CAS/VIS or RF-tagged objects.

Now, the computer unit 5 produces data and transmits it by RF-signals 7 which correspond to an object 6 on the test lane 4 in the path of truck 2. That is, the RF-signals 7 are emulating (at least partly) an object 6, in the example another oversized vehicle, which is in risk of collision with the truck 2 when the latter is driving on the test lane 4, e.g. by transmitting "virtual" data such as a virtual position, velocity, heading and/or vehicle's dimension/size.

In other words, the RF-signals 7 sent by computer unit 5 are as if these were RF-signals 7v sent by a real object at a certain position on the test lane 4, which is in the figure indicated by arrow 8. The computer unit 5 can even create a virtual dummy object in that it generates and transmits all RF-signals 7 that a real corresponding object would send.

Such a RF-signal 7 (or "dummy" RF-signal 7v) should trigger a reaction of the VIS 3 of the truck 2, however, as there is no real object on the test lane 4 but—so to say—only a virtual object 6, any malfunction of VIS 3 or no (proper) reaction of VIS 3 to a RF-signal will not cause any danger.

In the example, the utility vehicle 2 is driven by the operator on the test lane 4 with a velocity v (FIG. 1a), thus approaching the position which is transmitted by RF-signals 7 or advancing towards virtual object 6. Thereby, the virtual object 6 is in principle invisible for the driver of truck 2, however, the signalled position can be visibly marked, e.g. by a color spot or sign or the like at the respective position on the test lane. In particular, there may be a marking or warning sign at the test site 1, signalling to the driver that the VIS' auto brake will trigger in the area. Alternatively or additionally, the test lane 4 comprises guide lines indicated to the driver where to drive.

Figure 1B:
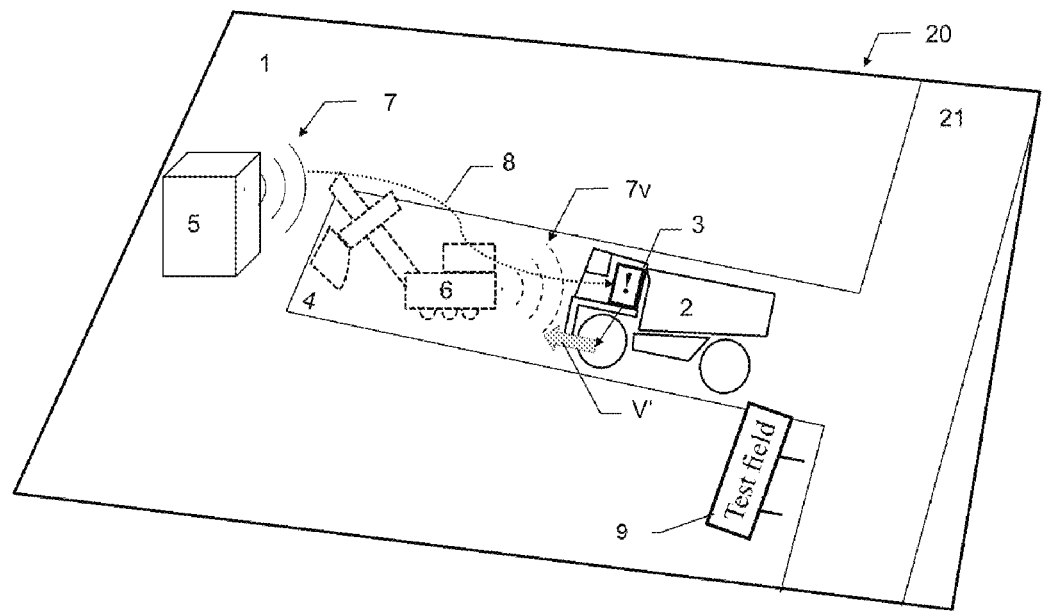

As indicated in FIG. 1b, as the truck 2 is getting close to the potential collision position or to the virtual object 6, which the VIS 3 is aware of by RF-signals 7 (indicated in the figure by the exclamation mark), the VIS 3 partly overrides the driver's control of truck 2 in that it reduces the speed to v', e.g. by controlling the truck's propulsion/motor and/or brakes (auto braking).

That is, in this case as indicated in FIG. 1b, the VIS 3 has reacted as intended, the test result is positive. The outcome of the validation of the VIS 3 can be simply noticed by the driver, e.g. in that he notices if the truck 2 is slowed down or stopped (e.g. within a certain marked area or time period) or if it is not. In other words, a "true positive" (i.e. successful system action) will immediately be felt by the operator via the truck's behaviour, either sudden braking when (virtually) "hitting" the opponent vehicle 6 ("auto brake"), propulsion cut when overlapping with the virtual opponent ("Launch-Assist"), intervention release when pressing the Override Button and so on.

Additionally or alternatively, the VIS 3 and/or computer unit 5 is configured to evaluate the test automatically—for example the computer unit 5 verifies presence of a trigger of an intervention command by the VIS 3 via RF- and indicate the test result to the driver, e.g. using a display of the VIS 3 and/or a signal unit as described in more detail with respect to the following figures. An evaluation external to the VIS 3 can for example be by transmitting log files from the VIS 3 to the computer unit 5 or an external server, checking the log files for a collision alarm caused by the artificial risk object, checking if the alarm triggered a reaction/intervention command of the VIS 3 and checking if the reaction of the VIS 3 was properly executed by the vehicle 2.

Figure 2:
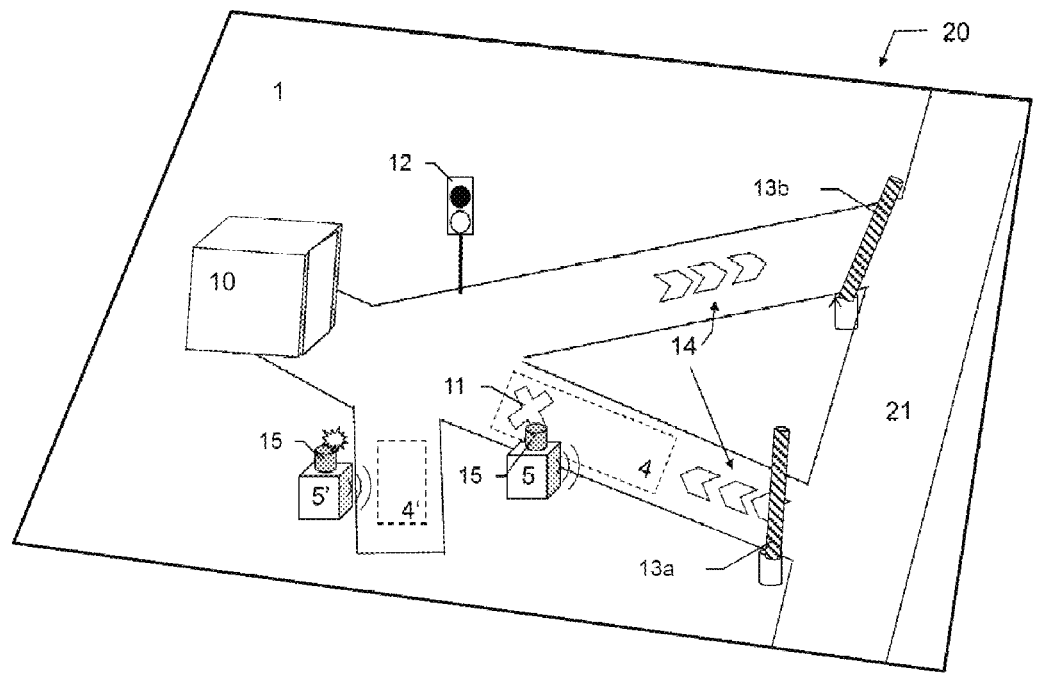
FIG. 2: shows another exemplary in-field test facility at a mine.

FIG. 2 shows another semi-3D-view of another exemplary test facility 1 at a mine 20. In the example, a utility vehicle with a VIS to be validated (not shown) can enter the test area through a gate 13a. In addition to such a visible mark 13a of the test facility 1, the facility 1 resp. its borders can be marked by a geofence. After entrance, the driver can drive, guided by floor marks 14 to a first test lane 4. At the first test 4, a first computer unit 5 is configured to generate and transmit RF-signals for testing a first function of the VIS, e.g. the launch assistant. In the example, for a positive check, the vehicle should be slowed down and stop at a visible marking 11 by the VIS.

The test facility 1 comprises a second test lane 4' with a second computer unit 5'. The computer units 5, 5' may be embodied as CAS units same as build in the vehicles and (re-)configured to implement the specific test functionality. Computer unit 5' at the second test place 4' is for instance configure to check the break assistant. In addition, at the second test station 4' or another test station, the function of an override button of the VIS can be checked, i.e. if it is possible for the driver to deactivate temporarily certain VIS-functions ("Bypass Mode" or "Override Button") or release a VIS' intervention.

Besides the functionalities of the VIS already mentioned or validating of critical safety features of level-9 functionalities, further testing is possible, such as test of proper working of e.g. the VIS communication within the vehicle and/or to external partners can be tested, for example response or readiness of the original equipment manufacturer (OEM) to the VIS commands (test if there is a fatal subsystem error or how the truck reacts to the VIS command of auto brake or Launch assistant). Further, CAN communication can be tested, in particular its basic or critical functions. Also, as the VIS is part of an underlying CAS, the readiness of the CAS itself can be checked, e.g. testing the operational status of GNSS, RF or user interface. Therefore, a computer unit 5 can be configured to transmit commands to a VIS which go beyond standard RF-signals of real vehicles. That is, such a computer unit does not only emulate a vehicle as a test dummy but provides additional test signals for testing further VIS/CAS functionalities. In particular, the validation can be a "full-chain" test of available sensors such as an IMU or vehicle's systems, in particular with regard to GNSS, radio link, ultra-wide band time-of-flight measurement unit, configuration, CAN-bus link, third party's vehicle controller (OEM) reaction to the VIS commands, action of the truck's drive system and brake system or other basic machine systems.

Anyway, the whole validation method is preferably configured in such a way that it consumes only little time, for example the complete check of a VIS can be done in a couple of minutes. Thus, the reliability test of a VIS can be a daily routine as a daily pre-flight check, e.g. integrated in a general or overall pre-flight check of the vehicle. A VIS or an external server the VIS is connected to may be configured to give out a warning or even prohibit operation on the site 20 of the utility vehicle if a validation has not been performed for a certain period, e.g. a validation is enforced at minimum every three days or after a certain number of operation hours.

As another option, the validation method can be customized to a VIS/vehicle (individually or per class or type of the VIS or vehicle). For example, a type of vehicle or type/version of VIS may be recognized or received by the computer unit 5, 5', e.g. by RF-communication of VIS ID, and the test procedure adapted accordingly. Also, a validation history may be taken into account. For example, test intervals may differ from vehicle to vehicle or the number/amount of specific tests may be varied. In particular in case of consideration of a test history, the adaption can also be dynamic, e.g. in that after each test procedure or depending on the age of the vehicle, the test procedure is re-configured. For example, the validation may also be adapted in that e.g. there is a "small" test procedure every day of the critical VIS functions and once a week a "grand", more time consuming procedure for testing also less critical features. Also, environmental conditions can be taken into account for adapting the validation method, for instance in that in very harsh conditions, e.g. very high temperatures or humidity, the test intervals are shortened.

Generally spoken, as the test facility 1 is on-site, a specific adaption or tailoring of the validation facility 1 resp. method to the specific demands at the scene is possible, not only with respect to environmental conditions which can be monitored on-site e.g. by sensors of the computer unit 5, 5', but also with respect to the costumer's fleet of utility vehicles or other demands of the costumer.

Another advantage of such an on-site test facility 1 is that an immediate reaction to test failures, in particular a repair in-the-field, before going to production or operation, is facilitated. As indicated by building 10, the test facility 1 may comprise a repair station or workshop 10 in case a test reveals that a VIS function is not working (properly). Alternatively or additionally, in case of a failing test, the VIS or the test facility 1 may automatically alert service personnel.

In particular as a reaction to critical failures, the test facility 1 can be configured to prevent an exit of the tested vehicle. In the example, a flash light 12 is present to signal if the tested vehicle can leave the test area 1 or not. Further, a (boom) gate 13b at the exit of the test zone 1 remains closed if the VIS did not pass all tests. Hence, any vehicle with a malfunctioning VIS cannot re-enter the haul road 21.

As an additional optional feature, the test facility 1 can comprise a surveillance camera (not shown) for monitoring exit and entry. For example, if monitoring the entry zone, the test method may be automatically started by test station 5 connected to the camera when entry of a vehicle of the test area 20 or of a test lane 4, 4' is viewed. Other detection methods may also trigger an automated start, e.g. by receiving RF-signals sent by the vehicle's VIS and received by a test station 5, 5'. A camera may also serve for vehicle identification or for monitoring a test, e.g. for providing additional test data which may be additionally taken into account for verifying if a VIS function is working properly or not or may be helpful to locate a source of error in case of a negative test result.

In particular with respect to single tests, e.g. at each test lane 4, 4', the result of a specific test can be signalled to the driver by the local test station 5, 5'. In the example, the test stations 5, 5' comprise a light 15, 15' which optically indicate if a test has been passed or not, e.g. by colors such as red and green. That is, e.g. a lamp mounted on top of the test station 5, 5' at the height of the operator's eye level will display if the test has been conducted successfully. A test result can also be shown on a driver's display as described with respect to FIG. 3.

Figure 3:
FIG. 3: shows an example of a control and display unit of an off-road vehicle intervention system as installed in a utility vehicle.

FIG. 3 shows an example of an on-board unit 16 of a VIS as installed in an utility, in particular oversized vehicle. The on-board unit 16 is used to give feedback to the driver about the result of a test of the VIS. In the example, the VIS is to be checked with respect to enforce a braking, that is the auto brake or brake assistant (BA) is to be triggered. In this case, the test is positive—the auto brake is indeed properly executed—and there is a signaling 18 on the display 17 that the auto brake (BA) is activated, both in words (center of the display) and as a symbol (left upper corner). The unit 16 can also be used to instruct the driver regarding the test procedure, e.g. where to or how to drive.

Validation or test results can be collected, for instance continuously or in regular intervals, e.g. at each workshop visit, as reports and/or alerts. Such reports, alerts or statistics may be indicated to the user via onboard unit 16 and/or e.g. to a superordinated controller and/or for long term evaluation of a specific vehicle and/or fleet. Test results may be recorded within the system/CAS and or in a server or backend infrastructure used for monitoring and reporting purposes.

As another option, in case that the on-site test reveals a failure of the VIS, the electronic unit 16 can initiate/perform or receive an evaluation of the failure and/or an according countermeasure if possible. For instance, there can be an automatic instant evaluating of a non-positive validation for determining countermeasures such as a reboot or reconfiguration of the VIS and instructing the vehicle's driver with respect to countermeasures using display 17 of the vehicle intervention system.

Although embodiments are illustrated above, partly with reference to some preferred embodiments, it must be understood that numerous modifications and combinations of different features of the embodiments can be made if not indicated otherwise. All of these modifications lie within the scope of the appended claims.

The invention claimed is:

1. An on-site test facility for validation of an off-road vehicle intervention system (VIS), the vehicle intervention system being installed onboard a utility vehicle and being configured to temporally take over from a utility vehicle's driver control of at least a motion function, in particular the propulsion and/or brake, of the utility vehicle in response to RF-signals sent by and received from an object on the site at risk of collision with the utility vehicle, the RF-signals at least transmitting positional data of the respective object, the on-site test facility comprising:
   a testing area at a working site with a test lane, and
   a computer unit configured to emulate one of said objects by generating and transmitting a RF-signal corresponding to a RF-signal of a real object being in risk of collision with the utility vehicle when a driver is driving the utility vehicle on the test lane.

2. The on-site test facility according to claim 1, wherein the emulated object is a movable object and the computer unit generates and transmits RF-signals containing positional data, designated heading data and dimensional data of the emulated object.

3. The on-site test facility according to claim 1, wherein the computer unit creates a virtual dummy object by generating and transmitting RF-signals corresponding to all types of RF-signals of the emulated object.

4. The on-site test facility according to claim 1, wherein the computer unit is configured to adapt the emulation to the utility vehicle or vehicle intervention system, either according to an individual utility vehicle or to a vehicle class.

5. The on-site test facility according to claim 1, wherein the computer unit is configured to validate auto brake, launch assistant and override button, in particular in addition to validate one of:
   RF-receiver,
   GNSS receiver,
   user interface,
   CAN communication,
   status of brake system and propulsion of the utility vehicle,
   inertial measurement unit,
   ultra-wide band time-of-flight measurement unit.

6. The on-site test facility according to claim 1, wherein the on-site test facility comprises a mark:
   for marking a real position corresponding to an object's emulated position on the test lane visible to the utility vehicle's driver, wherein the position mark is variable as an adaption to the emulated object type and/or position, and/or
   for marking an entry and/or exit of the test facility and/or test lane, in particular a geofence.

7. The on-site test facility according to claim 1, wherein the computer unit is configured to inhibit an exit of the utility vehicle from the test area if there is no positive validation result, in particular wherein the on-site test facility comprises a mechanical barrier at an exit of the test area controlled by the computer unit.

8. The on-site test facility according to claim 1, wherein the on-site test facility comprises a signal light for signalling a status of the validation to the driver, in particular a final result of the validation.

9. The on-site test facility according to claim 1, wherein the utility vehicle is an off-road utility vehicle.

10. The on-site test facility according to claim 1, wherein the utility vehicle is a haul truck, a crane, a dragline, an excavator, a shovel, a grader, a dozer, water truck, dump truck, mining truck, loader, camion or a tractor.

11. A method for on-site validation of an off-road vehicle intervention system (VIS) at an on-site testing area at a working site with a test lane, the vehicle intervention system being installed onboard an utility vehicle, in particular off-road utility vehicle, particularly a haul truck, a crane, a dragline, an excavator, a shovel a grader, a dozer, water truck, dump truck, mining truck, loader, camion or a tractor, and being configured to temporarily take over from the utility vehicle's driver control of at least a motion function, in particular the propulsion and/or brake, of the utility vehicle in response to RF-signals sent by and received from an object on the site at risk of collision with the utility vehicle, the RF-signals at least transmitting positional data of the respective object, the method comprising emulating one of said objects by generating and transmitting a RF-signal corresponding to a RF-signal of a real object being in risk of collision with the utility vehicle when a driver is driving the utility vehicle on the test lane.

12. The method according to claim 11, wherein verifying if a reaction of the vehicle intervention system, in particular a braking and/or propulsion cut, is triggered by a received RF-signal.

13. The method according to claim 12, wherein verifying comprises the steps of:
   uploading a log file from the vehicle intervention system to a server,
   looking for a collision alarm, caused by the emulated object, in the log file, and
   looking for an intervention command from the vehicle intervention system to the utility vehicle and for a confirmation of the intervention command by a main unit of the utility vehicle.

14. The method according to claim 13, wherein additionally verifying a vehicle's reaction in response to the intervention command is based on data from a sensor.

15. The method according to claim 14, wherein the sensor is a camera.

16. The method according to claim 11, further comprising displaying a position information and/or time information.

17. The method according to claim 16, wherein displaying the position information and/or time information includes time-to-impact relating to an expected reaction to be triggered to the utility vehicle's driver.

18. The method according to claim 11, wherein the method is an integral part of a regular, in particular daily, pre-flight check.

19. A computer program product having computer-executable instructions implemented for executing the method according to claim 11.

20. The method according to claim 11, wherein the utility vehicle is an oversized and/or off-road utility vehicle.

* * * * *